US010505486B2

(12) United States Patent
Matsunobu

(10) Patent No.: US 10,505,486 B2
(45) Date of Patent: Dec. 10, 2019

(54) MOTOR AND MOTOR CONTROL METHOD

(71) Applicant: LEAGIC CORPORATION, Chiba (JP)

(72) Inventor: Toshimi Matsunobu, Chiba (JP)

( * ) Notice: Subject to any disclaimer, the term of this patent is extended or adjusted under 35 U.S.C. 154(b) by 0 days.

(21) Appl. No.: 15/514,684

(22) PCT Filed: Oct. 1, 2015

(86) PCT No.: PCT/JP2015/077903
§ 371 (c)(1),
(2) Date: Mar. 27, 2017

(87) PCT Pub. No.: WO2016/063701
PCT Pub. Date: Apr. 28, 2016

(65) Prior Publication Data
US 2017/0222589 A1   Aug. 3, 2017

(30) Foreign Application Priority Data
Oct. 21, 2014  (JP) .................................. 2014-214134

(51) Int. Cl.
| H02M 5/45 | (2006.01) |
| H02P 23/06 | (2016.01) |
| H02P 25/08 | (2016.01) |
| H02P 25/092 | (2016.01) |
| H02P 3/06 | (2006.01) |

(52) U.S. Cl.
CPC .............. *H02P 25/08* (2013.01); *H02P 3/065* (2013.01); *H02P 25/092* (2016.02); *Y02P 80/116* (2015.11)

(58) Field of Classification Search
CPC .................................. H02M 5/45; H02P 23/06
See application file for complete search history.

(56) References Cited

U.S. PATENT DOCUMENTS 3,974,429 A * 8/1976 Friend ..................... B60L 50/11
388/806
4,052,647 A * 10/1977 Thompson .............. B60L 15/04
318/139

(Continued)

FOREIGN PATENT DOCUMENTS

| JP | 2002247889 | 8/2002 |
| JP | 2009065824 | 3/2009 |

(Continued)

*Primary Examiner* — Cortez M Cook
(74) *Attorney, Agent, or Firm* — Jack Schwartz & Associates, PLLC

(57) ABSTRACT

A motor and control method for making the generating and regeneration efficiency higher than before are provided. A motor including a rotor, a storage battery and a capacitor (a source) is provided to charge a produced electrical energy, a SR motor portion rotates the rotor by magnetic force produced with a current supplied by the source and generates by converting rotational energy of the rotor into electrical energy, current sensors measure the currents supplied to excitation coils, and a semiconductor switching control circuit for driving and generation to maintain the rotation by increasing the current with supply of electrical energy from the source to the excitation coils if the currents measured by the current sensors fall below a predetermined lower limit for making the rotor rotate due to the charging.

10 Claims, 8 Drawing Sheets

(56) References Cited

U.S. PATENT DOCUMENTS

| | | | | | |
|---|---|---|---|---|---|
| 4,426,610 | A | * | 1/1984 | Kawada | H02P 23/06 318/490 |
| 4,959,602 | A | * | 9/1990 | Scott | H02M 5/45 318/762 |
| 5,449,993 | A | * | 9/1995 | Davis | H02M 3/158 318/376 |
| 6,469,468 | B1 | * | 10/2002 | Hatsuda | H02P 25/092 318/254.2 |
| 2001/0017235 | A1 | * | 8/2001 | Suga | B66B 1/30 187/290 |
| 2013/0241451 | A1 | * | 9/2013 | Wei | H02J 9/005 318/400.3 |

FOREIGN PATENT DOCUMENTS

| | | |
|---|---|---|
| JP | 2011259539 | 12/2011 |
| JP | 2011259571 | 12/2011 |
| JP | 2013150491 | 8/2013 |

\* cited by examiner

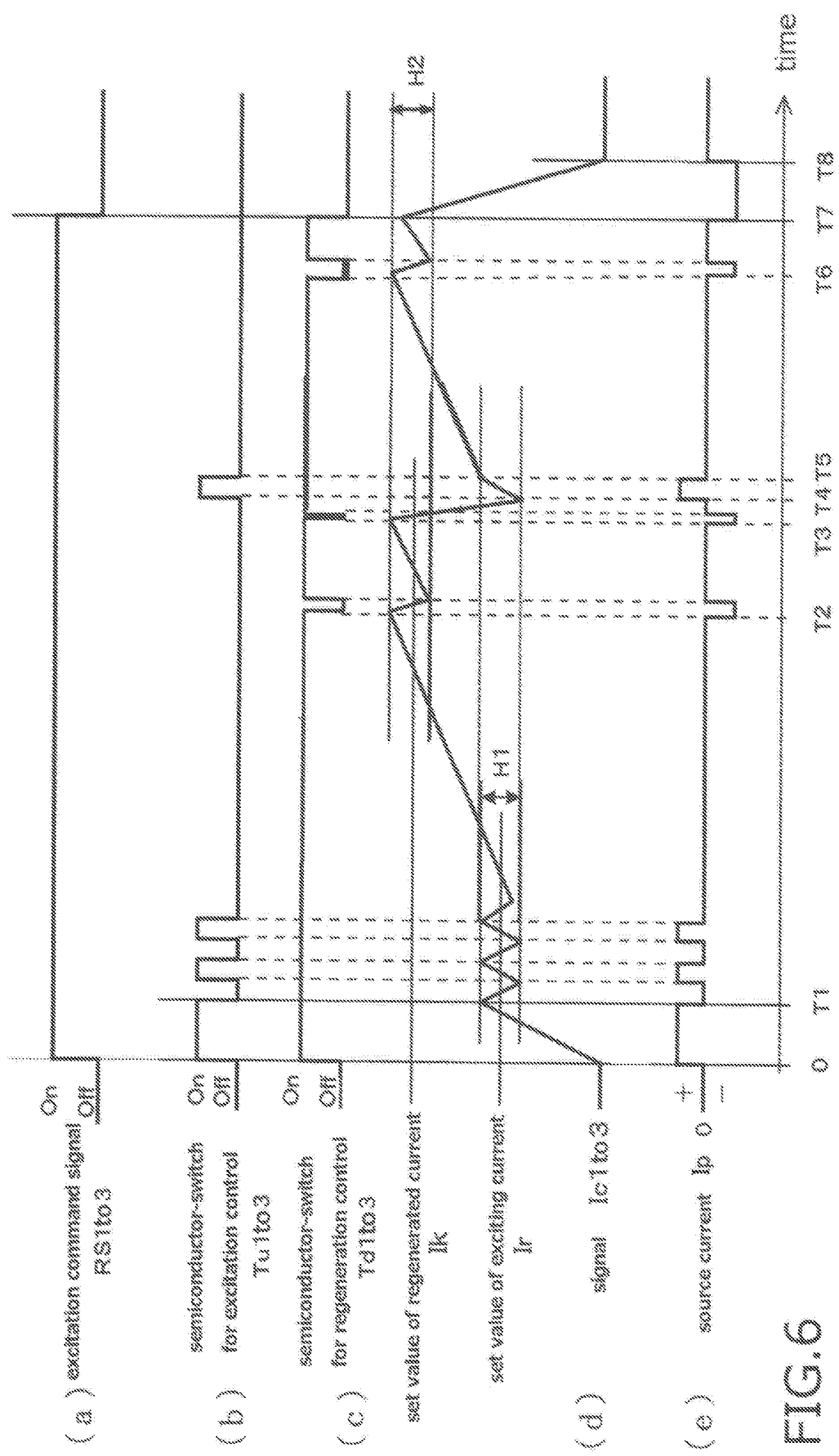

MOTOR AND MOTOR CONTROL METHOD

TECHNICAL FIELD

The present invention relates to motors and control techniques thereof.

BACKGROUND ART

Generally, in case that the operation of a switched reluctance motor (SR motor) without a permanent magnet is switched from driving to braking, regeneration of energy is performed by switching to so-called "operation mode of the generator" for converting the braking energy into electrical energy.

On the regeneration, a complicated regeneration circuit is used for necessity of returning a voltage generated with maintaining an exciting current of the SR motor to source-side. Also, a complicated circuit using a reactor and a capacitor etc. is used on the foregoing energy conversion.

Here, in the following patent document 1 and 2, regeneration-type SR motor driving systems are disclosed for downsizing the SR motor and for improving the energy recovery efficiency on the regenerative braking etc.

And, in the paragraphs [0044] etc. of the following patent document 3, a technique is disclosed for returning to the direct-current source 30 the current flowing through the winding for driving the SR motor.

And, in the paragraphs [0045] to [0056] of the following patent document 4, a technique is disclosed for reduction of the current consumption in the battery B by the energization control using the source of the battery B only in a predetermined time from starting the control of the SR motor 10 and using the energy stored in the first-phase coil CL1 for the rest of the time.

Here, in the technique, as seen in the paragraphs [0050] to [0051] of the patent document 4, the current I is gradually increased toward the target current value again by judging the timing of turning on the first low-potential-side transistor QL1 based on a timer so as to reestablish the closed-loop after the current I flowing through the first-phase coil CL1 has been reduced from the target current value.

RELATED ART DOCUMENTS

Patent Documents patent document 1: WO 2009/150714 A1
patent document 2: Japanese Unexamined Patent Application Publication No. 2010-130754
patent document 3: Japanese Unexamined Patent Application Publication No. 2012-44816
patent document 4: Japanese Unexamined Patent Application Publication No. 2002-247889

SUMMARY OF THE INVENTION

Problems to be Solved by the Invention

On the above motor, physical conditions for sustaining an excitation and a regeneration simultaneously are harsh because a generated voltage is low in a low-speed rotation range. So there is a problem that the generation is suspended in case that the conditions are not satisfied at any moment.

It should be noted that a complex circuit is needed for avoiding reduction of the generated voltage, and generating efficiency gets low, so that the regeneration in the low-speed rotation range is difficult even if the circuit is set up.

Also, as seen in the patent literature 4, there is another problem that ideal generating efficiency is not necessarily realized because the switching inherently makes energy loss in case that the close-loop including an excitation coil is switched on the basis of a timer.

For solving the above problems, the present invention has an object to provide a motor and a control method thereof for making the generating efficiency and regeneration efficiency higher than before by only simple means.

Means of Solving the Problems

For solving the problems, the present invention provides a motor including a rotor, a source, rotation means for rotating the rotor by magnetic force produced with a current supplied by the source and for making a generating operation to convert rotational energy of the rotor into electrical energy, charge means for charging the electrical energy generated by the generating operation, current quantity measuring means for measuring the current supplied to the rotation means, and control means for increasing the current with supply of electrical energy from the source to the rotation means so as to maintain the generating operation if the current measured by the current quantity measuring means falls below a predetermined lower limit for making the generating operation due to the charging.

For solving the problems, the present invention also provides a motor including a rotor, a source, rotation means for rotating the rotor by magnetic force produced with a current supplied by the source and for generating to convert rotational energy of the rotor into electrical energy, current quantity measuring means for measuring the current supplied to the rotation means, and control means for increasing the current with the generation of the rotation means without supplying the current from the source so as to maintain a regenerating operation if the current measured by the current quantity measuring means falls below a predetermined lower limit for maintaining the regenerating operation.

For solving the problems, the present invention also provides a motor control method for controlling a motor including a rotor, a source, rotation means for rotating the rotor by magnetic force produced with a current supplied by the source and for making a generating operation to convert rotational energy of the rotor into electrical energy, and charge means for charging the electrical energy generated by the generating operation, the motor control method includes a first step of measuring the current flowing through the rotation means and a second step of increasing the current with supply of electrical energy from the source to the rotation means so as to maintain the generating operation if the current measured in the first step falls below a predetermined lower limit for making the generating operation due to the charging.

For solving the problems, the present invention also provides a motor control method for controlling a motor including a rotor, a source, and rotation means for rotating the rotor by magnetic force produced with a current supplied by the source and for generating to convert rotational energy of the rotor into electrical energy, the motor control method includes a first step of measuring the current flowing through the rotation means, a second step of judging whether the current measured in the first step falls below a predetermined lower limit for maintaining a regenerating operation, and a third step of increasing the current with the generation of the rotation means without supplying the current from the source so as to maintain the regenerating operation when it is judged to fall below the lower limit in the second step.

Effects of the Invention

With the present invention, motors and control methods thereof are provided for realizing higher generating efficiency and regeneration efficiency than before.

BRIEF DESCRIPTION OF THE DRAWINGS

FIG. 6 is a timing-chart to show a control method for making the SR motor in FIG. 1 generate by low-speed rotation.

MODE FOR CARRYING OUT THE INVENTION

Figure 1:
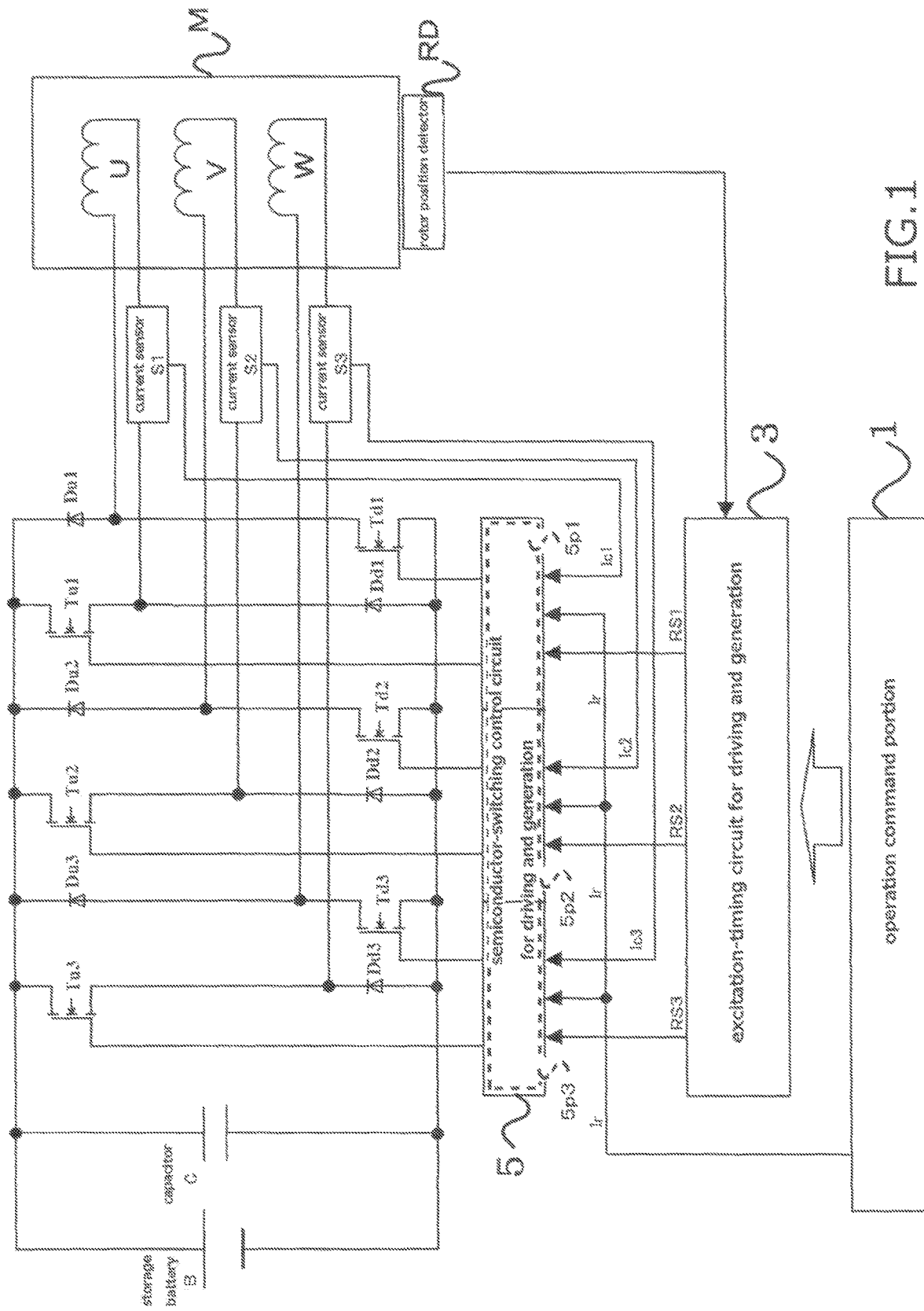
FIG. 1 is a diagram of a SR motor in accordance with an embodiment of the present invention showing a configuration thereof.

Hereinafter, the embodiments of the present invention is explained in detail referring to the drawings. It should be noted that identical symbols in the drawings show the same or a similar portion.

FIG. 1 is a diagram of a SR motor in accordance with an embodiment of the present invention showing a configuration thereof. As shown in FIG. 1, the SR motor in accordance with an embodiment of the present invention has an operation command portion 1, an excitation-timing circuit for driving and generation 3, a semiconductor-switching control circuit for driving and generation 5, a SR motor portion M including three-phase excitation coils U,V,W, a rotor position detector RD, current sensors S1 to S3, a storage battery B, a capacitor C, semiconductor-switches for excitation control Tu1 to Tu3, semiconductor-switches for regeneration control Td1 to Td3, and fast diodes Du1 to Du3, Dd1 to Dd3.

It should be noted that the semiconductor-switching control circuit for driving and generation 5 consists of three semiconductor-switching control circuits for driving and generation 5p1 to 5p3 with the identical configuration, which is described below.

Here, the operation command portion 1 is connected to the excitation-timing circuit for driving and generation 3 and the semiconductor-switching control circuit for driving and generation 5. The excitation-timing circuit for driving and generation 3 is connected to the rotor position detector RD and the semiconductor-switching control circuit for driving and generation 5.

And, the semiconductor-switching control circuit for driving and generation 5 is also connected to the current sensors S1 to S3 and gates of the semiconductor-switches for excitation control and regeneration control Tu1 to Tu3, Td1 to Td3.

And, the excitation coil U is connected between a source of the semiconductor-switches for excitation control Tu1 and a drain of the semiconductor-switches for regeneration control Td1. The excitation coil V is connected between a source of the semiconductor-switches for excitation control Tu2 and a drain of the semiconductor-switches for regeneration control Td2. The excitation coil W is connected between a source of the semiconductor-switches for excitation control Tu3 and a drain of the semiconductor-switches for regeneration control Td3.

And, the storage battery B is connected between sources of the semiconductor-switches for regeneration control Td1 to Td3 and drains of the semiconductor-switches for excitation control Tu1 to Tu3. The capacitor C is connected in parallel with the storage battery B.

And, the fast diodes Du1 to Du3 are respectively connected between the drains of the semiconductor-switches for regeneration control Td1 to Td3 and the positive terminal of the storage battery B. The fast diodes Dd1 to Dd3 are respectively connected between the negative terminal of the storage battery B and the sources of the semiconductor-switches for excitation control Tu1 to Tu3.

And, the current sensors S1 to S3 sense the current flowing from the sources of the semiconductor-switches for excitation control Tu1 to Tu3 to the excitation coils U,V,W. The rotor position detector RD, which is attached to the rotor shaft of the rotor R in FIG. 3 included in the SR motor portion M, detects the rotational position of the rotor R.

Figure 2:
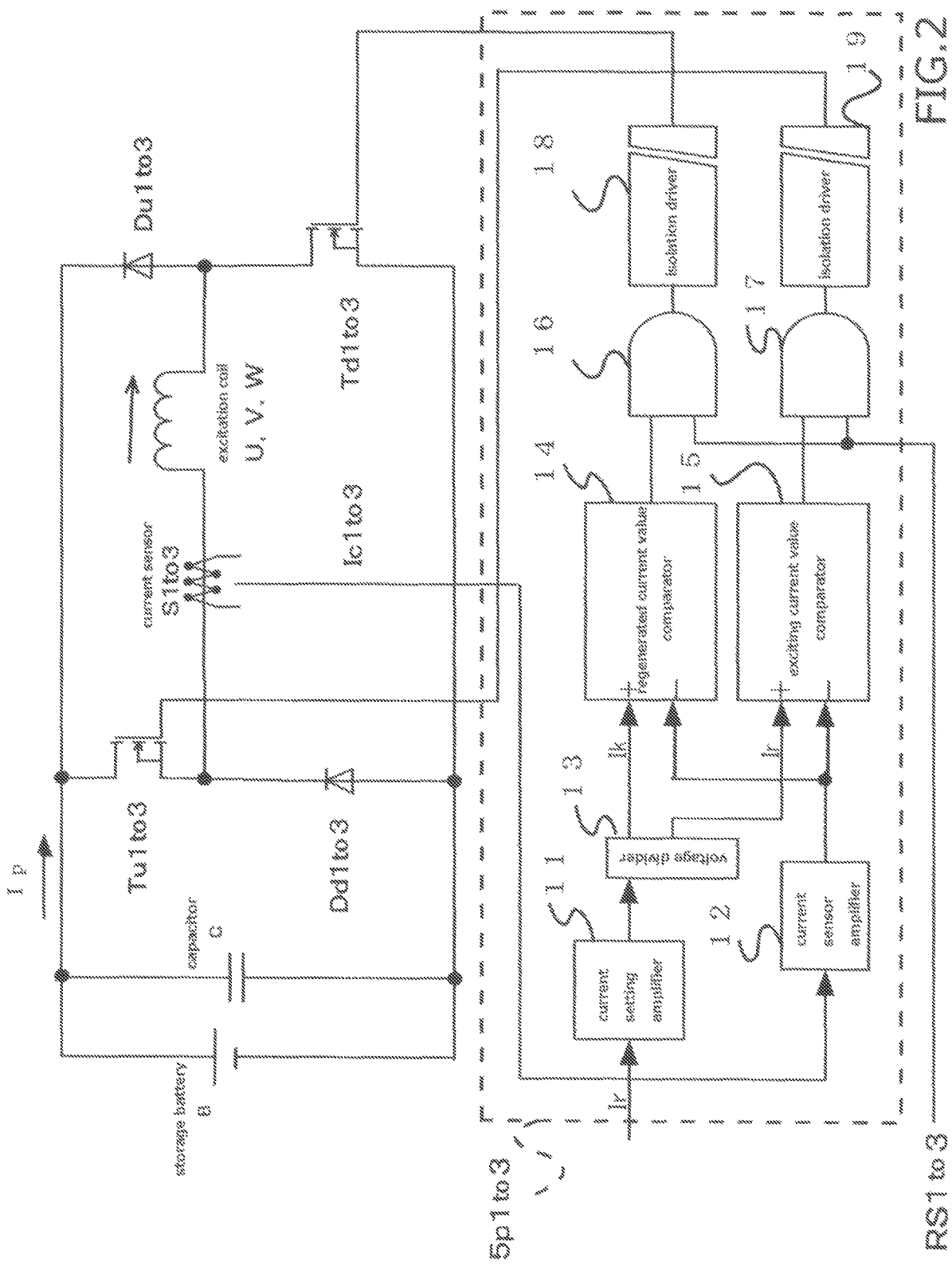
FIG. 2 is a circuit diagram to explain a configuration of the semiconductor-switching control circuit for driving and generation 5p1 to 5p3 shown in FIG. 1.

FIG. 2 is a circuit diagram to show a configuration of the semiconductor-switching control circuit for driving and generation 5p1 to 5p3 shown in FIG. 1.

As described above, these three semiconductor-switching control circuits for driving and generation 5p1 to 5p3 have the identical configuration, which is shown as that of a semiconductor-switching control circuit for driving and generation 5p1 to 3 in FIG. 2.

Then the semiconductor-switch for excitation control Tu1 to 3 in FIG. 2 means the semiconductor-switch for excitation control Tu1 in case that the above semiconductor-switching control circuit for driving and generation 5p1 to 3 is the semiconductor-switching control circuit for driving and generation 5p1 in FIG. 1. Likewise, the semiconductor-switch for excitation control Tu1 to 3 means the semiconductor-switch for excitation control Tu2 in case that the semiconductor-switching control circuit for driving and generation 5p1 to 3 is the semiconductor-switching control circuit for driving and generation 5p2, and the semiconductor-switch for excitation control Tu3 in case that the semiconductor-switching control circuit for driving and generation 5p1 to 3 is the semiconductor-switching control circuit for driving and generation 5p3.

It should be noted that the semiconductor-switch for regeneration control Td1 to 3, the fast diodes Du1 to 3,Dd1 to 3, the current sensor S1 to 3, the excitation coil U,V,W, an excitation coil current signal Ic1 to 3, and an excitation command signal RS1 to 3 are interpreted in like manner.

As shown in FIG. 2, the semiconductor-switching control circuit for driving and generation 5p1 to 3 includes a current setting amplifier 11, a current sensor amplifier 12, a voltage divider 13, a regenerated current value comparator 14, an exciting current value comparator 15, AND-circuits 16,17, and isolation drivers 18,19.

Here, the current setting amplifier 11 is connected to the operation command portion 1 in FIG. 1 and the voltage divider 13. The input terminal of the current sensor amplifier 12 is connected to the current sensor S1 to 3, and the output terminal of the current sensor amplifier 12 is connected to the minus (−) input terminals of the regenerated current value comparator 14 and the exciting current value comparator 15.

The output terminal of the voltage divider 13 is connected to the plus (+) input terminals of the regenerated current value comparator 14 and the exciting current value comparator 15, and the output terminals of the regenerated current value comparator 14 and the exciting current value comparator 15 are respectively connected to the input terminals of AND-circuits 16,17.

And, both the other input terminals of AND-circuits 16,17 are connected to the excitation-timing circuit for driving and generation 3, and the output terminals of AND-circuits 16,17 are respectively connected to the input terminals of the isolation drivers 18,19.

And, the output terminal of the isolation driver 18 is connected to the gate of the semiconductor-switch for regeneration control Td1 to 3, and the output terminal of the isolation driver 19 is connected to the gate of the semiconductor-switch for excitation control Tu1 to 3.

Figure 3:
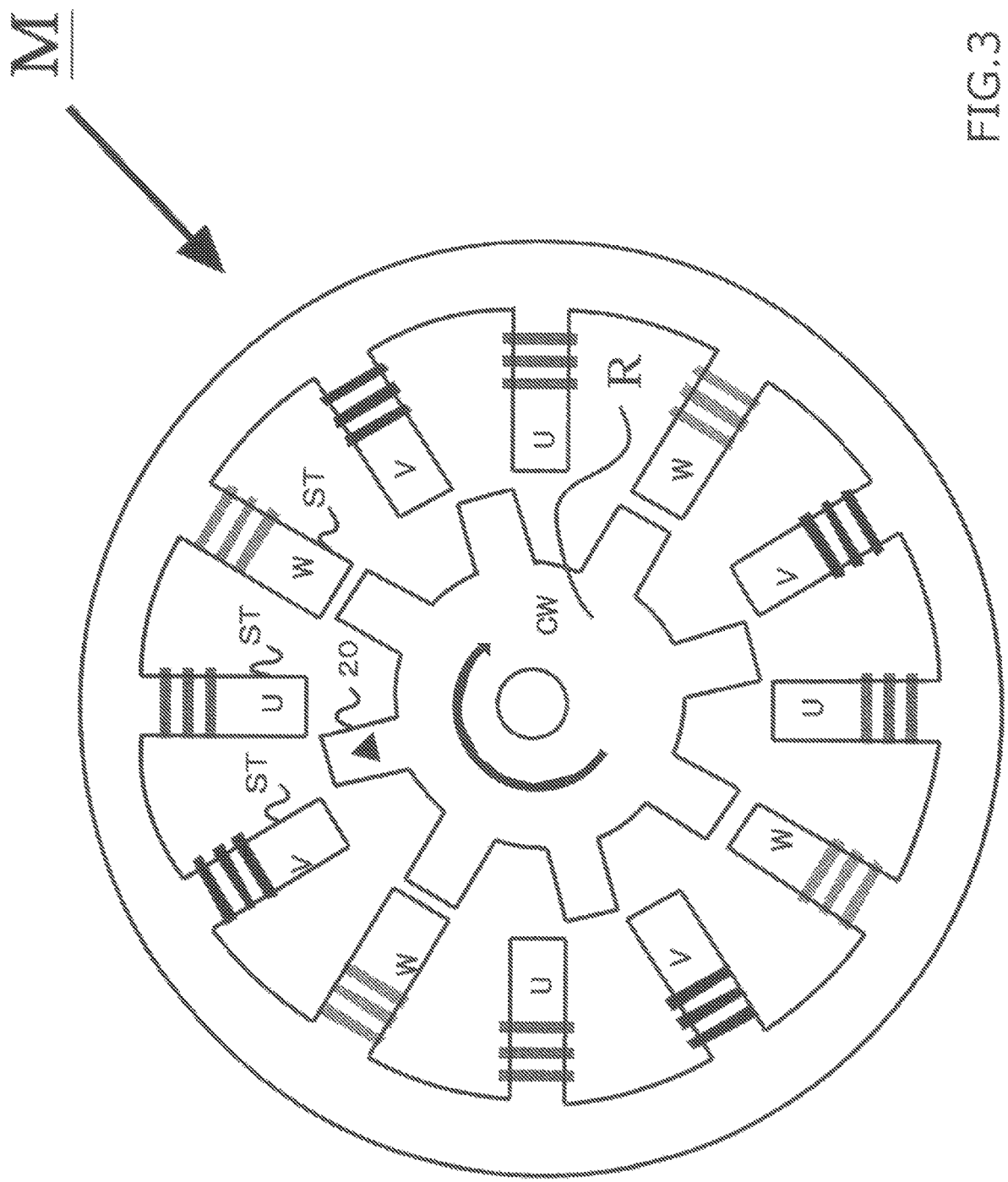
FIG. 3 is a diagram of the SR motor portion M in FIG. 1 showing a configuration thereof.

FIG. 3 is a diagram of the SR motor portion M in FIG. 1 showing a configuration thereof. As shown in FIG. 3, the SR motor portion M includes a stator ST with the windings of three-phase excitation coils U,V,W and a rotor R as a rotor.

Here, the rotor R rotates on an axis which is vertical to the paper plane and has eight salient 20 that are spaced rotation angle 45° apart around the axis. And twelve stators ST with any one of the windings of the excitation coils U,V,W are spaced rotation angle 30° apart around the axis, the stators ST of which with any one of the windings of the excitation coils U,V,W with an identical phase are respectively spaced rotation angle 90° apart around the axis.

Driving and generating operations by the SR motor portion M are explained below. It should be noted that the "driving" means that kinetic energy is produced from electrical energy, and the "generating" means that electrical energy is produced from the kinetic energy or the rotational energy in case that a rotor included in a SR motor has been rotated with kinetic energy or external kinetic energy, which is produced in the driving operation.

And, the following "regenerating" means that the energies in the excitation coils U,V,W are recovered, that is to say charged, to the storage battery B and the capacitor C (both of the storage battery B and the capacitor C are called "a source" below) as electrical energy.

It should be noted that not only a source for driving operation but also other sources can receive a charge in the recovery (or the charge).

On the driving operation, for example, when the rotor R is under a state shown in FIG. 3, the rotor R is pulled into the excitation coil U and rotates in the direction CW (clockwise) if the excitation coil U is energized by applying a constant current to only the excitation coil U.

Then the rotation of the rotor R can be driven continuously by applying the constant current to the excitation coils U,V,W, which are switched in order of the excitation coil U, the excitation coil V, and the excitation coil W.

On the other hand, the generating operation utilizes changes of the magnetic flux in the excitation coils U,V,W that are under the constant-current excitation. The changes are induced by rotating the rotor R with an external force under the state that one of the excitation coils U,V,W wound onto the stator ST, just under of which the rotor R is overlapping each other, is energized by applying a constant current. Therefore the generating operations are made by the same times as the number of the stators ST, namely twelve times, during one rotation of the rotor R shown in FIG. 3.

That is to say that the electrical energies are produced in the excitation coils U,V,W by such changes of the flux under the law of electromagnetic induction and recovered to the source.

It should be noted that the generated energy needs to be equal to or larger than sum of the energy needed for maintaining the exciting current and volume of the energy loss in the circuit for the recovery (we call it "necessary condition for recovery" below) because it is necessary that the exciting currents flowing through the excitation coils U,V,W themselves be maintained by the above energies produced in the excitation coils U,V,W during the recovery.

The reason is that the generating operation will be stopped instantly if the exciting current should not be maintained under the state of not meeting the necessary condition for recovery.

And generally, for recovering the above electrical energies by utilizing the difference between the source voltage and the generated voltage, it is a necessary and sufficient condition (we call it "necessary and sufficient condition for recovery" below) that the electromotive forces (generated voltages) produced in the excitation coils U,V,W by the above changes of the flux are equal to or larger than sum of the source voltage and volume of the voltage drop in the circuit for the recovery.

The generating operation is described concretely below. For example, if the excitation coil W is energized by flowing a constant current into only the excitation coil W when the rotor R is under the state shown in FIG. 3, the rotor R is pulled to the excitation coil W. Then since the magnetic flux changes under the constant current excitation state, in which the above constant current flows into the excitation coil W, the electromotive force and the generated voltage are produced in the excitation coil W when the rotor R is rotated in the direction CW by an external force. It should be noted that the generated voltage is relative to the turning speed of the rotor R.

In such a way, continuous generations are realized by switching the excitation coil W, the excitation coil V, and the excitation coil U in a serial order for energizing them, and converting the rotational energy of the rotor R into the electrical energy.

As a result, the SR motor portion M can generate electricity by the change of the flux, which occurs when the rotor R passes through the stators ST with the winding of any one of the excitation coils U,V,W, without using a magnet differently from an ordinary magnet-type generator.

Therefore, in the SR motor as the preferred embodiment of the present invention, controls for driving according to the positional relation between the rotor R and the stator ST, for generating, and for regenerating are important.

So the principle of the generation by the rotor R and the stators ST with the winding of any one of the excitation coils U,V,W is explained in more detail in reference to FIGS. 4A to 4C below.

Figure 4A:
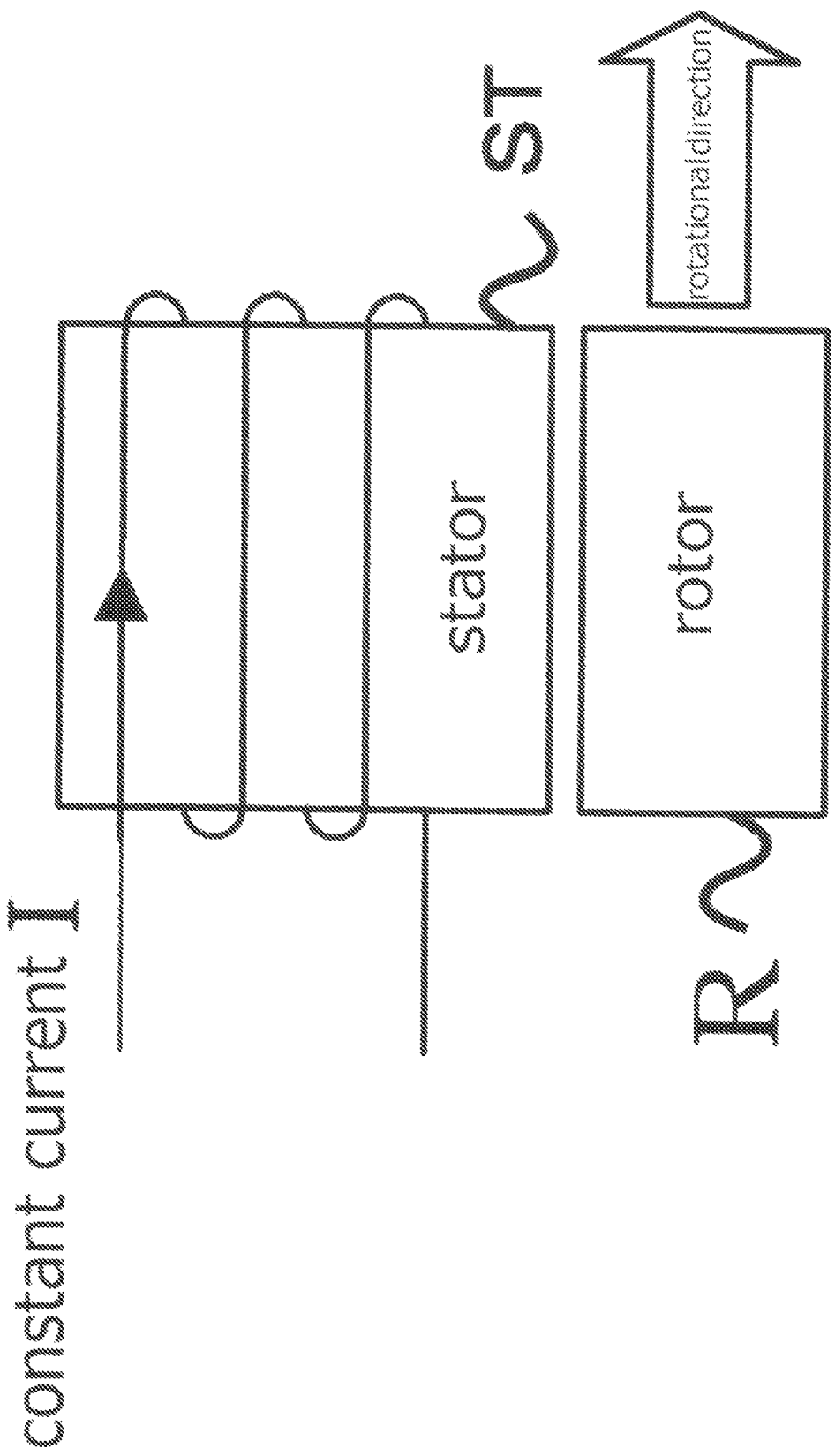
FIG. 4A is a first diagram to explain the principle of generation by the rotor R and the stators ST with windings of excitation coils U,V,W shown in FIG. 3, and shows a positional relation between the stator ST and the rotor R at the start of generation in one generation process.
Figure 4B:
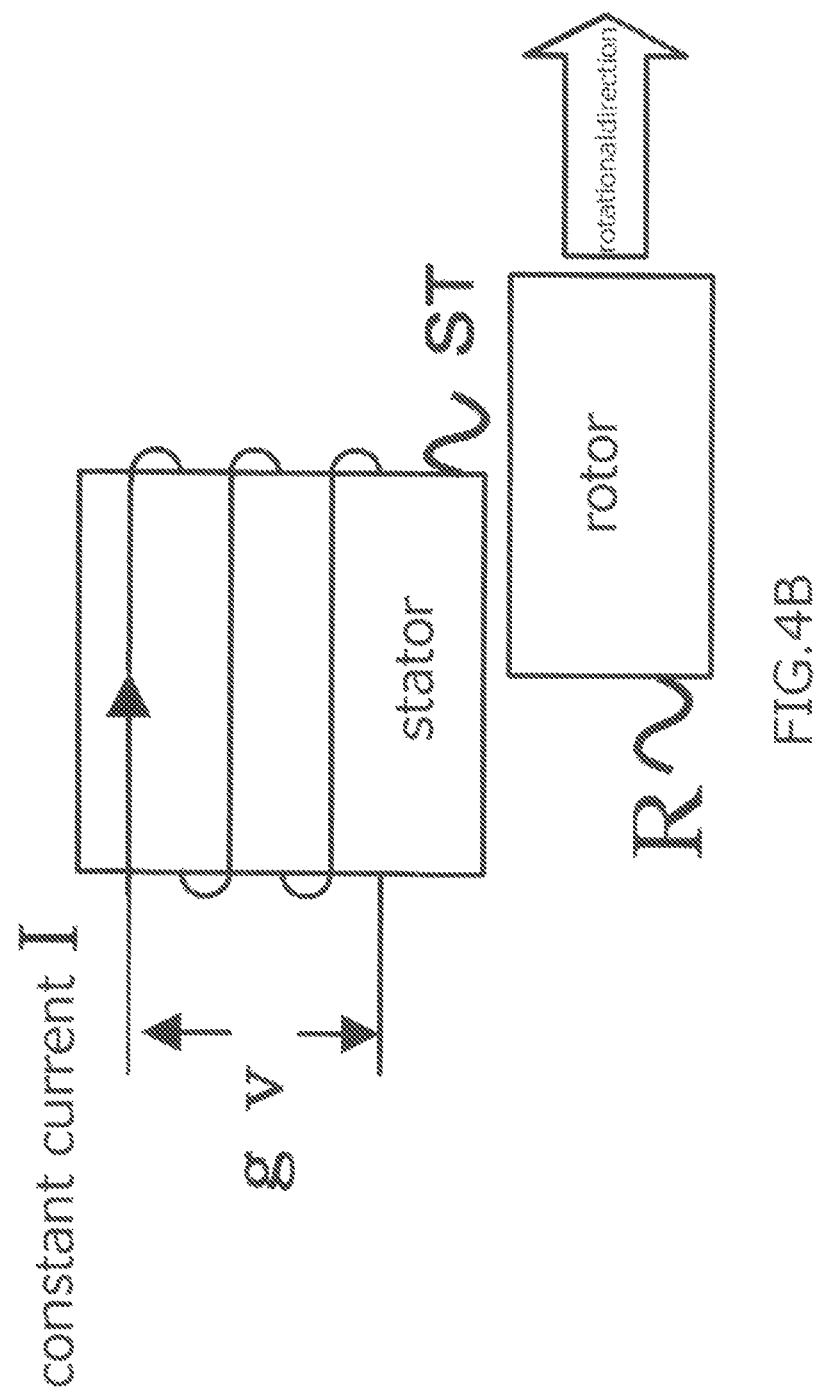
FIG. 4B is a second diagram to explain the principle of generation by the rotor R and the stators ST with windings of excitation coils U,V,W shown in FIG. 3, and shows a positional relation between the stator ST and the rotor R under generation in one generation process.
Figure 4C:
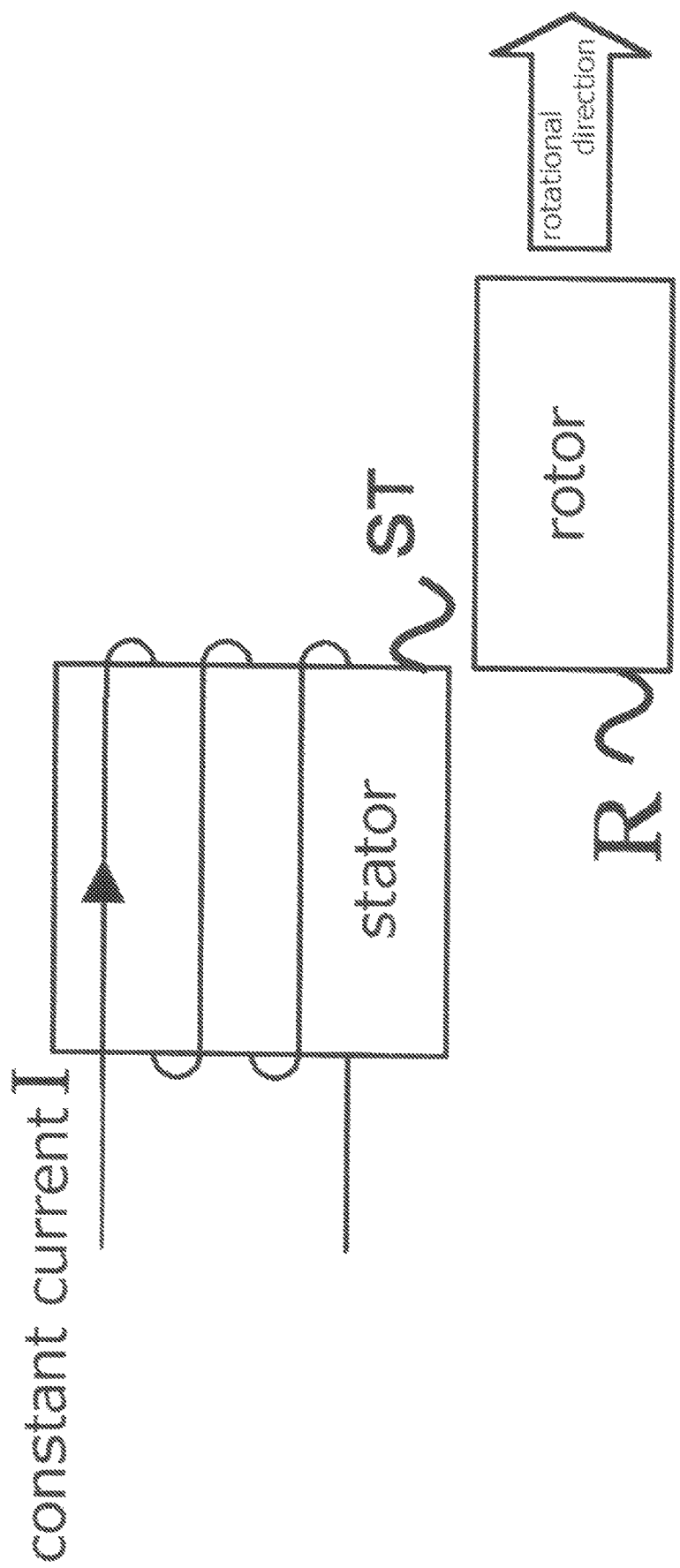
FIG. 4C is a third diagram to explain the principle of generation by the rotor R and the stators ST with windings of excitation coils U,V,W shown in FIG. 3, and shows a positional relation between the stator ST and the rotor R at the end of generation in one generation process.

Here, FIGS. 4A to 4C respectively show the positional relations between the stator ST and the rotor R at the start of the generation, under the generation, and at the end of the generation in the above one generation operation.

It should be noted that, in all of FIGS. 4A to 4C, the winding of the stator ST is any one of the excitation coils U,V,W, and shows an identical coil.

And, each of the rotors R in FIGS. 4A to 4C shows any one of the above eight salient 20 around the axis of the rotor R in FIG. 3.

As shown in FIG. 4A, the stator ST pulls the rotor R with the magnetic force produced by the excitation coil because a constant current I flows in the excitation coil of the stator ST when the rotating rotor R is positioned just under the stator ST and overlaps each other.

Then, the overlap between the stator ST and the rotor R reduces when the rotor R rotates more in the turning direction with the kinetic energy (the rotational energy) enough to escape from the suction force by the stator ST as shown in FIG. 4B. The generated voltage gv according to the change of the flux is induced at the excitation coil because the flux inside the excitation coil reduces in this way.

After that, as shown in FIG. 4C, the generation ends when the rotor R rotates furthermore in the turning direction and gets into the state that the rotor R does not overlap the stator ST at all because the flux inside the excitation coil does not vary anymore.

From the above, the electricity is generated only during the time when the rotor R passes just under the stator ST which is energized by a constant current.

From this, the SR motor as the preferred embodiment of the present invention can realize the condition for the above generation by the control of energizing the stator ST according to the position of the rotor R, and regenerate the electrical energy obtained by the generation.

More concretely, the SR motor as the preferred embodiment of the present invention increases the currents flowing in the excitation coils U,V,W (we call it "exciting current" below) by returning the energy obtained with the generation to the closed-loop circuit including the excitation coils U,V,W under the excitation state, stores the energies in the excitation coils U,V,W, and recovers the stored energy into the source, namely charges.

In the following, referring to FIG. 1 and FIG. 2, the operations of the SR motor as an embodiment of the present invention are respectively described in detail under a state of the generation by high-speed rotation of the rotor R (we call it "high-rotation mode" below) and another state of the generation by low-speed rotation of the rotor R (we call it "low-rotation mode" below).

It should be noted that, in the both modes, the rotor R begins to rotate when the salient 20 of the rotor R under a stopped state has been pulled to the nearest energized excitation coil as explained referring to FIG. 4A.

Figure 5:
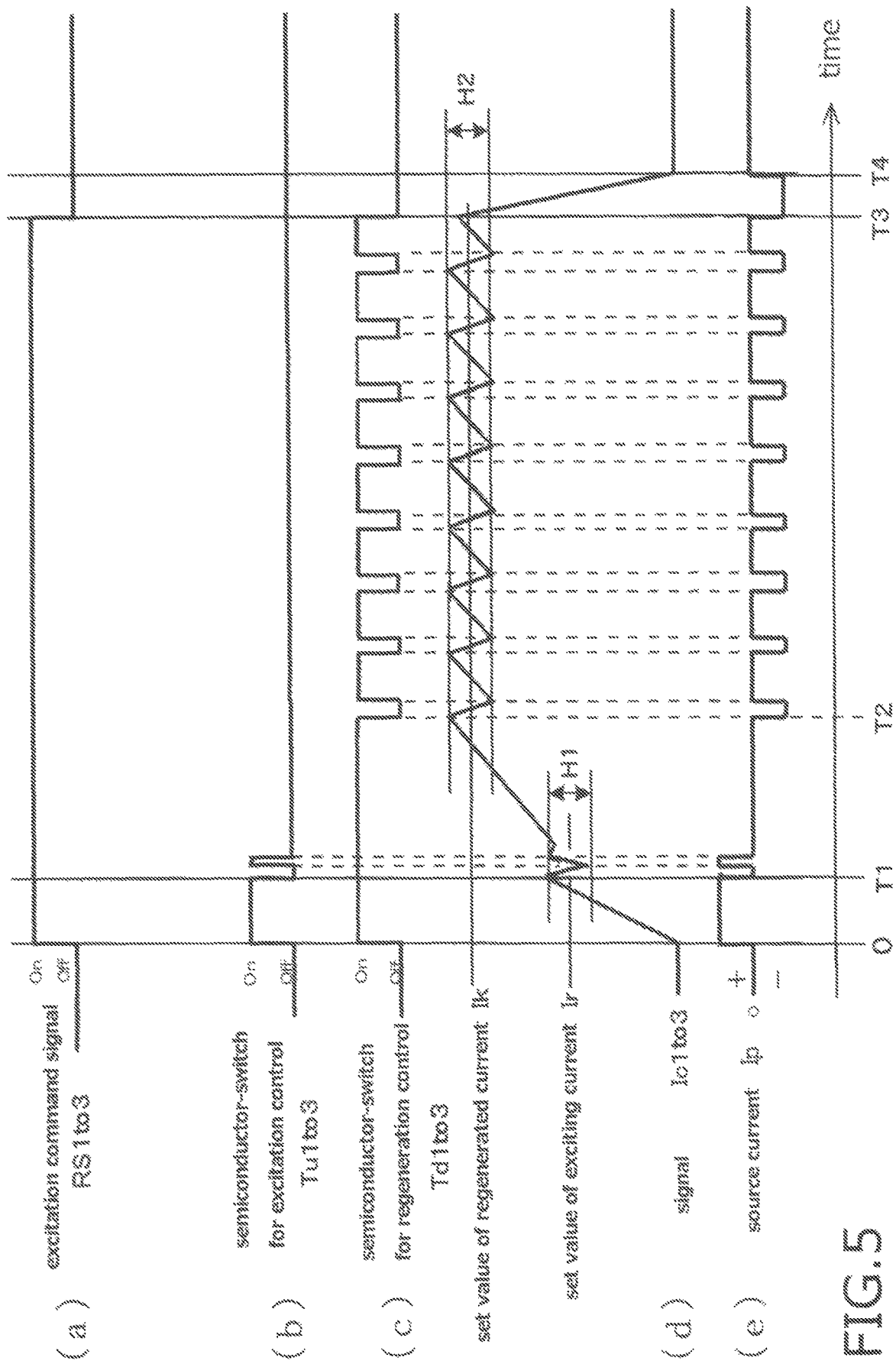
FIG. 5 is a timing-chart to show a control method for making the SR motor in FIG. 1 generate by high-speed rotation.

FIG. 5 is a timing-chart to show a control method for making the SR motor in FIG. 1 operate under the high-rotation mode. Firstly in the following, the operation under the high-rotation mode is explained referring to the drawing.

In FIG. 5, at the time 0 to the time T1, the above excitation is made under a state, in which (a salient 20 of) the rotor R is just below the stator ST and wholly overlapped by the stator ST as shown in FIG. 4A. And, at the time T1 to the time T3, the excitation, the generating operation, and the regenerating operation are made under a state, in which (the salient 20 of) the rotor R is partially overlapped by the stator ST as shown in FIG. 4B. At the time T3 to the time T4, the regenerating operation is made under a state, in which (the salient 20 of) the rotor R is not overlapped by the stator ST as shown in FIG. 4C.

First of all, when a user of the SR motor in FIG. 1 sets a set value of exciting current Ir and manipulates the operation command portion 1 for making the motor generate, the operation command portion 1 provides a generation command signal to the excitation-timing circuit for driving and generation 3.

The excitation-timing circuit for driving and generation 3 that has received the generation command signal switches the low level (Off) of the excitation command signal RS1 to 3 to the high level (On), as shown in the timing-chart (a) of FIG. 5, at the time 0 when it is judged according to the signal, which is provided from the rotor position detector RD and shows a rotational position of the rotor R, that the rotor R is just below the nearest stator ST and wholly overlapped by the stator ST.

On the other hand, the set value of exciting current Ir which the above user has set in the operation command portion 1 is provided to the current setting amplifier 11 in FIG. 2.

The current setting amplifier 11 amplifies an input set value of exciting current Ir and provides it to the voltage divider 13. After the voltage divider 13 divides the voltage of an input signal, it provides the produced set value of regenerated current Ik to a plus (+) input terminal of the regenerated current value comparator 14 and provides the set value of exciting current Ir to a plus (+) input terminal of the exciting current value comparator 15.

And, the current sensor S1 to 3 in FIG. 2 detects the current flowing to the excitation coil U,V,W and provides the signal Ic1 to 3 indicative of the detected exciting current to the current sensor amplifier 12.

The current sensor amplifier 12 amplifies the input signal Ic1 to 3, and provides the amplified signal (we call it "current amplification signal" below) to an minus (−) input terminal of the regenerated current value comparator 14 and an minus (−) input terminal of the exciting current value comparator 15.

Then, the exciting current value comparator 15, as shown in the timing chart (d) of FIG. 5, compares [the set value of exciting current Ir supplied to the plus input terminal+a half of the hysteresis H1] (we call it "upper limit of exciting current" below) with a current amplification signal supplied to the minus input terminal, outputs a signal of the high level in case that the current amplification signal is smaller than the upper limit of exciting current, and switches an output signal to the low level at the time when the current amplification signal has become bigger than the upper limit of exciting current.

And, the exciting current value comparator 15 switches an output signal from the low level to the high level at the time when the current amplification signal has become smaller than [the set value of exciting current Ir supplied to the plus input terminal—a half of the hysteresis H1] (we call it "lower limit of exciting current" below).

It should be noted that the above hysteresis H1 is set to the exciting current value comparator 15 in advance.

Likewise, the regenerated current value comparator 14, as shown in the timing chart (d) of FIG. 5, compares [the set value of regenerated current Ik supplied to the plus input terminal+a half of the hysteresis H2] (we call it "upper limit of regenerated current" below) with a current amplification signal supplied to the minus input terminal, outputs a signal of the high level in case that the current amplification signal is smaller than the upper limit of regenerated current, and switches an output signal to the low level at the time when the current amplification signal has become bigger than the upper limit of regenerated current.

And, the regenerated current value comparator 14 switches an output signal from the low level to the high level at the time when the current amplification signal Ik has become smaller than [the set value of regenerated current Ik supplied to the plus input terminal–a half of the hysteresis H2] (we call it "lower limit of regenerated current" below).

It should be noted that the above hysteresis H2 is set to the regenerated current value comparator 14 in advance.

Accordingly, since the exciting current is zero at the time when a user conducts the above manipulation, the regenerated current value comparator 14 and the exciting current value comparator 15 output signals of the high level.

Therefore, the AND circuits 16,17 respectively provide a signal of the high level to the isolation drivers 18,19 at the time 0 when the excitation command signal RS1 to 3 has made transition to the high level as the above.

Then, since the isolation drivers 18,19 respectively, as shown in the timing charts (c) and (b) of FIG. 5, supply a signal of the high level to the gate of the semiconductor-switch for regeneration control Td1 to 3 and the gate of the semiconductor-switch for excitation control Tu1 to 3, both the semiconductor-switch for regeneration control Td1 to 3 and the semiconductor-switch for excitation control Tu1 to 3 are turned on.

Hence, as shown in the timing chart (e) of FIG. 5, a source current Ip flows from the positive terminal of the storage battery B to the semiconductor-switch for excitation control Tu1 to 3, the excitation coil U,V,W, the semiconductor-switch for regeneration control Td1 to 3, and the negative terminal of the storage battery B.

It should be noted that, in the timing chart (e) of FIG. 5, the source current Ip (consumption current) flowing from the positive terminal of the storage battery B to the negative terminal of the storage battery B via a circuit including the semiconductor-switch for excitation control Tu1 to 3 etc. is shown by plus (+), and the source current Ip (charging current) flowing from the negative terminal of the storage battery B to the positive terminal of the storage battery B via a circuit including the fast diode Du1 to 3 etc. is shown by minus (−).

Then, since the electromotive force is induced in the excitation coil U,V,W in case that the magnetic flux inside the excitation coil U,V,W has been varied by the rotation of the rotor R, as shown in the timing chart (d) of FIG. 5, the exciting current increases with time.

After that, when the exciting current has become larger than the upper limit of exciting current at the time T1, the exciting current value comparator 15 switches the high level of an output signal to the low level as the above.

Hence, as shown in the timing chart (b) of FIG. 5, the semiconductor-switch for excitation control Tu1 to 3 is turned off because the signal supplied to the gate of the semiconductor-switch makes transition to the low level. And, as shown in the timing chart (e) of FIG. 5, the source current Ip becomes zero.

Because of this, as shown in the timing chart (d) of FIG. 5, the exciting current decreases.

And, as shown in the timing chart (d) of FIG. 5 and the timing chart (b) of FIG. 5, at the time when the exciting current has become smaller than the lower limit of exciting current, the signal supplied to the gate of the semiconductor-switch for excitation control Tu1 to 3 makes transition to the high level and the switch is turned on because the exciting current value comparator 15 switches an output signal to the high level as the above.

Hence, the exciting current increases in the same way as from the time 0 to the time T1 as shown in the timing chart (d) of FIG. 5 because the source current Ip of plus (+) flows again as shown in the timing chart (e) of FIG. 5.

And, as shown in the timing charts (d), (b), (e) of FIG. 5, the same operation as that at the time T1 is made when the exciting current has become larger than the upper limit of exciting current. As a result, the exciting current is maintained in the range of the hysteresis H1.

Here, a closed-loop consisting of the excitation coil U,V,W, the semiconductor-switch for regeneration control Td1 to 3, and the fast diode Dd1 to 3 is formed when the semiconductor-switch for excitation control Tu1 to 3 is turned off as shown in the timing chart (b) of FIG. 5. So, in case that the large electromotive force is induced by the fast rotation of the rotor R, the current flowing through the closed-loop is increased and the electrical energy is stored in the excitation coil U,V,W, as shown in the timing chart (d) of FIG. 5.

In this way, when the exciting current has become larger than the upper limit of regenerated current at the time T2, the regenerated current value comparator 14 switches an output signal to the low level. So, as shown in the timing chart (c) of FIG. 5, the signal supplied to the gate of the semiconductor-switch for regeneration control Td1 to 3 is also switched to the low level, and the switch is turned off.

Hence, a closed-loop consisting of the fast diode Dd1 to 3, the excitation coil U,V,W, the fast diode Du1 to 3, and the source (we call it "regeneration-loop" below) is formed because both the semiconductor-switch for excitation control Tu1 to 3 and the semiconductor-switch for regeneration control Td1 to 3 are turned off.

And, as shown in the timing chart (e) of FIG. 5, the source current Ip flows from the positive terminal of the storage battery B to the negative terminal of the storage battery B via the interior of the storage battery B in the regeneration-loop (we call such a current "regenerated current" below). By this way, the energy in the excitation coil U,V,W is returned to the source.

It should be noted that such a return to the source is made by utilization of the sufficient voltage produced by the self-induced electromotive force which is generated in the excitation coil U,V,W by the switching operation of the semiconductor-switch for regeneration control Td1 to 3 at the time when the exciting current has become larger than the upper limit of regenerated current as the above.

And then, as shown in the timing chart (d) of FIG. 5, the exciting current decreases due to the above regeneration. Since the regenerated current value comparator 14 switches an output signal to the high level when the exciting current has decreased to the lower limit of regenerated current, the semiconductor-switch for regeneration control Td1 to 3 is turned on by getting the signal to be supplied to the gate of the switch switched to the high level as shown in the timing chart (c) of FIG. 5.

Hence, a closed-loop consisting of the excitation coil U,V,W, the semiconductor-switch for regeneration control Td1 to 3, and the fast diode Dd1 to 3 (we call it "generation-loop" below) is formed. So, as shown in the timing chart (e) of FIG. 5, the source current Ip becomes zero.

In the generation-loop, as the foregoing, the current increases due to the electromotive force generated in the excitation coil U,V,W by the fast rotation of the rotor R, and the electrical energy is stored in the excitation coil U,V,W.

After that, when the current flowing through the excitation coil U,V,W has become larger than the upper limit of regenerated current, the same operation as that at the time T2 is made. So, as shown in the timing charts (c) to (e) of FIG. 5, the exciting current is maintained in the range of the hysteresis H2 at the time T2 to T3, and the energy generated in the excitation coil U,V,W is returned to the source intermittently.

At the time T3, the excitation-timing circuit for driving and generation 3 judges on a signal, which is supplied by the rotor position detector RD, indicative of the position of the rotor R that the positional relation between the rotor R and the stator ST is under the state shown in FIG. 4C, and deactivates the excitation by switching the excitation command signal RS1 to 3 from the high level to the low level as shown in the timing chart (a) of FIG. 5.

Therefore, since an output signal of the AND circuit 16 is switched to the low level, the signal supplied to the gate of the semiconductor-switch for regeneration control Td1 to 3 is switched to the low level. So the switch is turned off.

Then, since the regeneration-loop is formed, the energy to be retained in the excitation coil U,V,W is returned to the source, and the exciting current decreases between the time T3 and the time T4 as shown in the timing chart (e) of FIG. 5.

From the time when the rotor R continues the rotating in direction CW furthermore, and has overlapped just below the next stator ST, the same operations as the above those between the time 0 and the time T4 are made again.

The foregoing is a way of control for making the SR motor in FIG. 1 operate in the high-rotation mode. By maintaining the exciting current in the hysteresis H1, which consists of the upper limit of exciting current and the lower limit of exciting current set previously in the above way, frequency of the switching by the semiconductor-switch for excitation control Tu1 to 3 can be made a required minimum one.

Hence, the rotor R can be driven stably while the consumption power of the source is restrained to a minimum.

And, by the intermittent regenerating operation with the exciting current being maintained in the hysteresis H2, which consists of the upper limit of regenerated current and the lower limit of regenerated current set previously in the above way, the regenerating operation can be maintained while frequency of the switching by the semiconductor-switch for regeneration control Td1 to 3 is made a required minimum one.

Hence, more efficient generating operation and regenerating operation in the energy can be realized because the energy loss by the above switching is restrained to a minimum, and the regenerating operation can be maintained stably.

It should be noted that similar effects are realized by using a closed-circuit, which consists of the excitation coil U,V,W, the fast diode Du1 to 3, and the semiconductor-switch for excitation control Tu1 to 3, in place of the above generation-loop, and this is applicable to the following control method in FIG. 6 also.

And, since the above hysteresis H1 and the hysteresis H2 are adopted in the following control method in FIG. 6 also, similar effects are realized.

FIG. 6 is a timing-chart to show a control method for making the SR motor in FIG. 1 operate in the low-rotation mode. In the following, the operation under the low-rotation mode is explained referring to the figure.

It should be noted that, in FIG. 6, from the time 0 to the time T1, the above excitation is made under a state in which (a salient 20 of) the rotor R is just below the stator ST and wholly overlapped by the stator ST as shown in FIG. 4A. And, from the time T1 to the time T7, the excitation, the generating operation, and the regenerating operation are made under a state in which (the salient 20 of) the rotor R is partially overlapped by the stator ST as shown in FIG. 4B. From the time T7 to the time T8, the regenerating operation is made under a state in which (the salient 20 of) the rotor R is not overlapped by the stator ST as shown in FIG. 4C.

Since the operation between the time 0 and the time T3 in FIG. 6 is similar to that between the time 0 and the time T3 in FIG. 5, and the operation between the time T6 and the time T8 in FIG. 6 is similar to that between the time T2 and the time T4 in FIG. 5, explanations about the operations in these terms of FIG. 6 are omitted.

As shown in the timing chart (d) of FIG. 6, the regenerating operation in the regeneration-loop is made in the above way from the time T3, and the exciting current decreases with the operation. Then, it is hard to circulate the generation-loop is formed by turning on the semiconductor-switch for regeneration control Td1 to 3 when the exciting current has decreased to the lower limit of regenerated current, because the generated power is small in case that the rotor R rotates at a low speed. Hence a large electromotive force is not produced in the excitation coil U,V,W differently from under the high-rotation mode shown in FIG. 5.

Therefore, as shown in the timing chart (d) of FIG. 6, when the exciting current decreases lower than the lower limit of regenerated current and reaches to the lower limit of exciting current at the time T4, the exciting current value comparator 15 switches an output signal to the high level and turns on the semiconductor-switch for excitation control Tu1 to 3 as shown in the timing chart (b) of FIG. 5.

Hence, as shown in the timing chart (e) of FIG. 6, the source current Ip flows from the positive terminal of the storage battery B to the negative terminal of the storage battery B in order of the semiconductor-switch for excitation control Tu1 to 3, the excitation coil U,V,W, and the semiconductor-switch for regeneration control Td1 to 3 between the time T4 and the time T5. So, as shown in the timing chart (d) of FIG. 6, the exciting current flowing through the excitation coil U,V,W increases.

It should be noted that the operation between the time T4 and the time T5 has the meaning of supplying the electrical energy from the source to the excitation coil U,V,W for maintaining the generating operation and the regenerating operation with the excitation coil U,V,W.

Thereafter, since the exciting current value comparator 15 switches an output signal to the low level when the exciting current has become larger than the upper limit of exciting current, the signal to be supplied to the gate of the semiconductor-switch for excitation control Tu1 to 3 is also switched to the low level, and the switch is turned off as shown in the timing chart (b) of FIG. 6.

Hence, the exciting current flowing through the excitation coil U,V,W increases with time to the time T6 as shown in the timing chart (d) of FIG. 6 because the source current Ip becomes zero as shown in the timing chart (e) of FIG. 6, and the generating operation similar to the above is made by forming the generation-loop.

And, the rotor R further continues rotating in the direction CW under the low-rotation mode shown in FIG. 6 as under the high-rotation mode shown in FIG. 5, and the same operations as the above those between the time 0 and the time T8 are made again from the time when the rotor R has overlapped just below the next stator ST.

From the above, according to the SR motor as an embodiment of the present invention shown in FIG. 1, the semiconductor-switch for excitation control Tu1 to 3 is turned on at the time when the current flowing through the excitation coil U,V,W has decreased to the lower limit of exciting current even though the rotational speed of the rotor R decreases during the regenerating operation to lower the generated power, and the current flowing through the excitation coil U,V,W has become smaller than the lower limit of regenerated current to suspend the charge. Thereby the regenerating operation can be maintained without a stop because the source supplies the excitation coil U,V,W with the electrical energy needed to maintain the regenerating operation.

Accordingly, the simple SR motor in FIG. 1 is able to realize the regenerating operation to the low-speed rotation range of the rotor R and to make the ratio of the regenerated power by the regenerated current to the consumption power by the source current Ip flowing from the positive terminal to the negative terminal of the storage battery B namely the regeneration efficiency higher than before.

And, the above necessary condition for the recovery can be fully satisfied because the energy loss in the circuit used during the regeneration can be made nearly zero by simplifying the configuration as the above.

Furthermore, as the above, the necessary and sufficient condition can be surely satisfied independent of the source voltage used during the regeneration because the generated voltage can be increased to the infinite theoretically by utilizing the self-induced electromotive force under a self-induction phenomenon in the excitation coil U,V,W.

Also, since the SR motor in FIG. 1 is not influenced by the decrease of the magnetic force under a high temperature because of not using a permanent magnet, there are characteristics of realizing the driving operation, the generating operation, and the regenerating operation of the rotor R stably, and not producing a cogging torque.

And, the SR motor in FIG. 1 has broad usage because it can be used as not only a rotating motor to rotate the rotor R but also a generator.

Then, in case that the SR motor is used as a generator in the above way, it can be realized to convert the mechanical kinetic energy into the electrical energy and to regenerate efficiently by flowing the exciting current suitable for the mechanical torque to drive the generator into the excitation coil U,V,W.

It should be noted that, needless to say, the motor control method as an embodiment of the present invention shown in the timing charts of FIG. 5 and FIG. 6 can be broadly applied to not only the SR motor shown in FIGS. 1 to 4C but also other motors with another configuration.

DESCRIPTION OF THE REFERENCE NUMERAL 1 operation command portion, 3 excitation-timing circuit for driving and generation, 5,5P1 to 5P3 semiconductor-switching control circuit for driving and generation, 11 current setting amplifier, 13 voltage divider, 14 regenerated current value comparator, 15 exciting current value comparator, M SR motor portion, R rotor, U,V,W excitation coil, RD rotor position detector, S1 to S3 current sensor, B storage battery, Td1 to Td3 semiconductor-switch for regeneration control, Tu1 to Tu3 semiconductor-switch for excitation control

The invention claimed is:

1. A motor comprising:
a rotor;
a source;
a coil to rotate the rotor by magnetic force produced with a current supplied by the source, the rotational energy of the rotor being converted into electrical energy during a generating operation;
a charge element to provide the converted electrical energy;
a current quantity measuring element to measure the current supplied to said coil; and
a control element to increase the current with electrical energy from the source to said coil until the current becomes larger than an upper limit upon determining the current measured by said current quantity measuring element reaches a lower limit for making the generated energy equal to or larger than a sum of an energy needed for maintaining an exciting current of the coil and an energy to be lost in the charge element wherein, if the current measured by said current quantity measuring element falls below a lower limit for making a generated voltage produced in the coil equal to or larger than a sum of a voltage of the source and a voltage to be dropped in the charge element, said control element further increases the current flowing in the coil by utilizing self-induced electromotive force without supplying the current from the source to maintain a regenerating operation.

2. The motor according to claim 1, wherein said source serves as said charge element.

3. The motor according to claim 1,
wherein the motor is a switched reluctance motor, and
wherein said coil is a three-phase coil and the electrical energy is produced by a change of flux in the three-phase coil by the rotation of said rotor.

4. A motor comprising:
a rotor;
a source;
a coil to rotate the rotor by magnetic force produced with a current supplied by the source and, rotational energy of the rotor being converted into electrical energy;
a charge element to provide the electrical energy produced by the conversion;
a current quantity measuring element to measure the current supplied to said coil; and
a control element to increase the current flowing in the coil by utilizing self-induced electromotive force without supplying the current from the source until the current becomes larger than an upper limit upon determining the current measured by said current quantity measuring element decreases to a lower limit for making the generated voltage produced in the coil equal to or larger than a sum of a voltage of the source and a voltage to be dropped in the charge element.

5. The motor according to claim 4,
wherein the motor is a switched reluctance motor, and
wherein said coil is a three-phase coil and the electrical energy is produced by a change of flux in the three-phase coil by the rotation of said rotor.

6. A motor control method for controlling a motor comprising a rotor, a source, a coil to rotate the rotor by magnetic force produced with a current supplied by the source, the rotational energy of the rotor being converted into electrical energy during a generating operation, and a charge element to provide the electrical energy produced by the conversion, the motor control method comprising:
measuring the current flowing through said coil; and
increasing the current with electrical energy from the source to said coil until the current becomes larger than an upper limit upon determining the measured current reaches a lower limit for making the generated energy equal to or larger than a sum of an energy needed for maintaining an exciting current of the coil and an energy to be lost in the charge element wherein the method further comprises increasing the current flowing in the coil by utilizing self-induced electromotive force without supplying the current from the source to maintain a regenerating operation if the measured current falls below a lower limit for making a generated voltage produced in the coil equal to or larger than a sum of a voltage of the source and a voltage to be dropped in the charge element.

7. The motor control method according to claim 6, wherein said source serves as said charge element.

8. The motor control method according to claim 6,
wherein the motor is a switched reluctance motor, and
wherein said coil is a three-phase coil and the electrical energy is produced by a change of flux in the three-phase coil by the rotation of said rotor.

9. A motor control method for controlling a motor comprising a rotor, a source, a coil to rotate the rotor by magnetic force produced with a current supplied by the source, the rotational energy of the rotor being converted into electrical energy, and a charge element to provide the electrical energy produced by the conversion, the motor control method comprising:
  measuring the current flowing through said coil;
  judging whether the measured current decreases to a lower limit for making the generated voltage produced in the coil equal to or larger than a sum of a voltage of the source and a voltage to be dropped in the charge element; and
  increasing the current flowing in the coil by utilizing self-induced electromotive force without supplying the current from the source until the current becomes larger than an upper limit upon determining it is judged to decrease to the lower limit.

10. The motor control method according to claim 9,
wherein the motor is a switched reluctance motor, and
wherein said coil is a three-phase coil and the electrical energy is produced by a change of flux in the three-phase coil by the rotation of said rotor.

* * * * *